(12) United States Patent
Wang et al.

(10) Patent No.: US 6,622,006 B1
(45) Date of Patent: Sep. 16, 2003

(54) SYSTEM AND METHOD FOR DETECTING A LINK OUTAGE

(75) Inventors: Ludong Wang, Germantown, MD (US); Yezdi Antia, Gaithersburg, MD (US); Jerry Dai, Germantown, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 449 days.

(21) Appl. No.: 09/677,524

(22) Filed: Oct. 2, 2000

Related U.S. Application Data

(60) Provisional application No. 60/179,682, filed on Feb. 2, 2000.

(51) Int. Cl.⁷ .............................................. H04B 7/185
(52) U.S. Cl. ...................... 455/12.1; 455/428; 375/350
(58) Field of Search ................ 455/12.1, 13.1, 455/427, 428; 375/350, 354.355, 336, 344, 326

(56) References Cited

U.S. PATENT DOCUMENTS

| | | | | |
|---|---|---|---|---|
| 4,969,163 A | * | 11/1990 | Ungerboeck | 375/234 |
| 5,740,204 A | * | 4/1998 | Nagashima | 375/341 |
| 5,794,155 A | * | 8/1998 | Andresen et al. | 455/517 |
| 5,828,957 A | * | 10/1998 | Kroeger et al. | 455/428 |
| 5,859,874 A | * | 1/1999 | Wiedeman et al. | 375/267 |
| 6,144,708 A | * | 11/2000 | Maruyama | 375/327 |
| 6,181,732 B1 | * | 1/2001 | Komatsu | 375/150 |
| 6,490,328 B1 | * | 12/2002 | Wu | 375/346 |

* cited by examiner

*Primary Examiner*—Nay Maung
*Assistant Examiner*—Tan Trinh
(74) *Attorney, Agent, or Firm*—John T. Whelan; Michael Sales

(57) ABSTRACT

A communications system has a high altitude communication device generates a plurality of user link beams having a first communication characteristic and a feeder link having a first communication characteristic. A gateway terminal receives the user link beam for receiving a first received signal and a second received signal thereafter. The receiver circuit has a recursive filter for generating differential amplitude of symbol timing estimate from said first received signal.

13 Claims, 4 Drawing Sheets

SYSTEM AND METHOD FOR DETECTING A LINK OUTAGE

RELATED APPLICATION

This application claims priority to Provisional Application No. 60/179,682, entitled "Robust Link Outage Detection" filed on Feb. 2, 2000.

TECHNICAL FIELD

The present invention relates generally to communications systems, and more particularly, to outage detection in a time division multiplex communications systems.

BACKGROUND ART

In this communication age, content providers are increasingly investigating ways in which to provide more content to users as well as interfacing with users.

Communication satellites have become commonplace for use in many types of communication services, e.g., data transfer, voice communications, television spot beam coverage, and other data transfer applications. As such, satellites transmit and receive large amounts of signals used in either a "bent pipe" or "spot array" configuration to transmit signals to desired geographic locations on the earth.

Because the frequency of resources is scarce for over-the-air transmission, various encoding schemes are used to provide a greater number of communication signals within an allocated communication band. Such encoding schemes include code division multiple access (CDMA), time division multiple access (TDMA), frequency division multiple access (FDMA), or combination of these schemes. Further, to prevent interference the schemes may operate at various frequencies.

In TDMA mobile transmission systems, occasional channel impairments are inevitable. This may occur due to a link outage due to a full obstruction of the radio path. Blockage of the radio path may result in a receive signal being weak or extremely noisy. Commonly, when an outage occurs no-target tracking or drifting of synchronization systems occurs.

Outage detection is conventionally based on observation of the signal-to-noise ratio (SNR) or a cyclic redundancy check (CRC). The application of SNR is constrained by its limited confidence range. That is, reliable detection may not be achieved when the channel condition is unfavorable. In its implementation, a CRC is usually performed on different hardware from that of the demodulation hardware. Thus, such systems require complicated logic signaling interactions. For both SNR and CRC based systems, the detection is performed after the demodulation. Because of this, the computation is lengthy.

It would therefore be desirable to design an simple outage detection procedure with less computation that also allows quick resumption of transmission and reliable maintenance of synchronization after an outage occurrence.

SUMMARY OF THE INVENTION

It is therefore one object of the invention to provide an improved outage detection system in a TDMA system.

In one aspect of the invention, a method for operating a communication system comprises the steps of:
  receiving a received signal;
  estimating a differential symbol timing from two consecutive bursts;
  generating a detection metric;
  comparing the obtained detection metric with predetermined threshold to determine the outage status.

In one aspect of the invention, a high altitude communication device generates a plurality of user link beams having a first communication characteristic and a feeder link having a first communication characteristic. A gateway terminal receives the user link beam. A user terminal has a receiver circuit for receiving a first received signal and a second received signal thereafter. The receiver circuit has a recursive filter for generating an amplitude estimate from said first received signal.

One advantage of the invention is that system detection accuracy may be increased by using further techniques such as dual threshold detection and multiple observation in addition to the basic amplitude determination.

Other objects and features of the present invention will become apparent when viewed in light of the detailed description of the preferred embodiment when taken in conjunction with the attached drawings and appended claims.

BEST MODES FOR CARRYING OUT THE INVENTION

Figure 1:
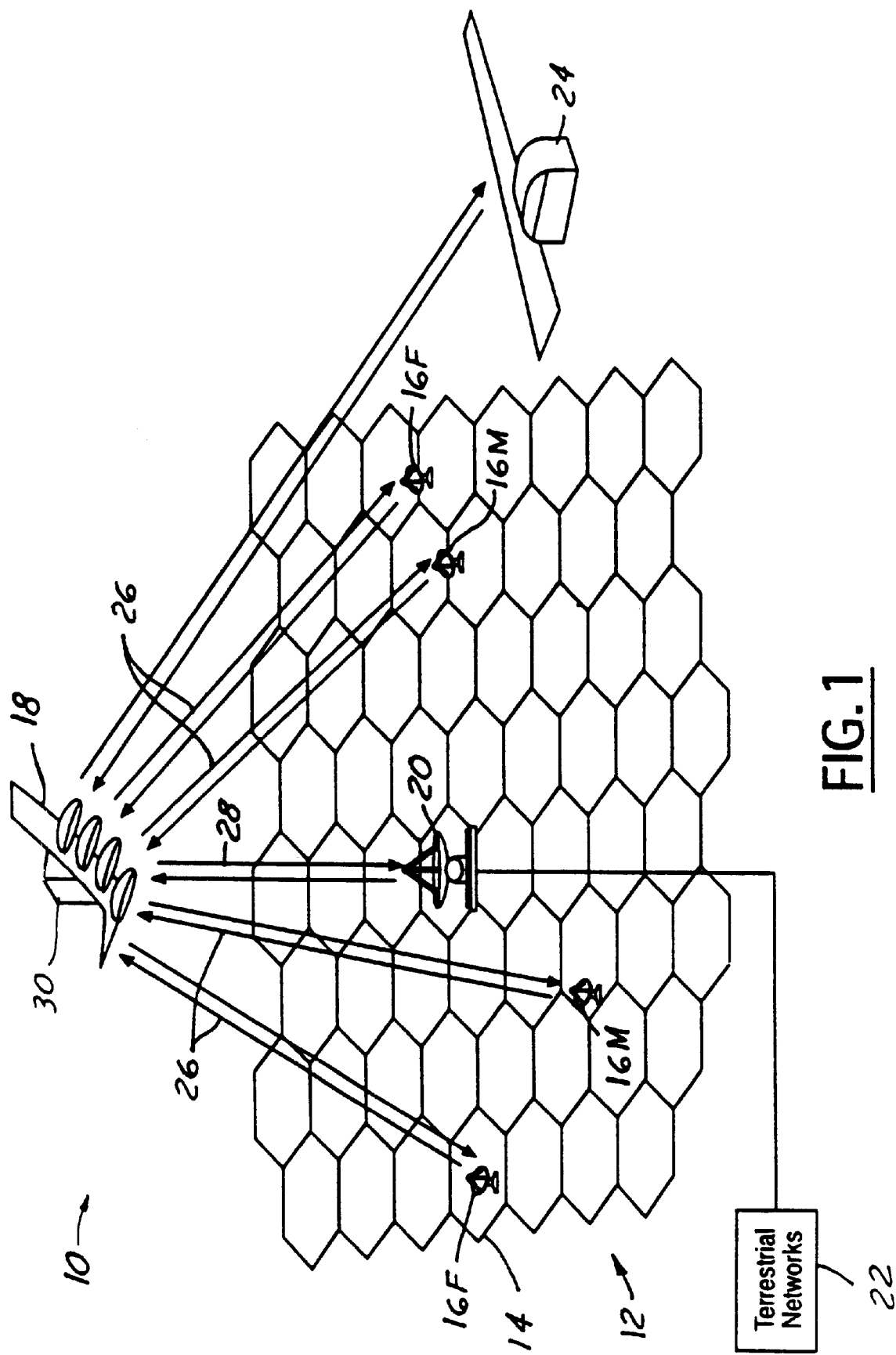
FIG. 1 is a system level view of the communication system according to the present invention.

In the following description, the same reference numerals are used to identify the same components in the various views. Those skilled in the art will recognize that various other embodiments, structural changes and changes in measures may be made without departing from the scope of the invention.

Referring now to FIG. 1, a communications system 10 has a cell pattern 12 that is illustrated as a plurality of hexagon on the earth's surface. The hexagons represent the footprint of a radiated beam onto the earth's surface. These are otherwise known as cells 14. Each cell 14 represents a geographic area that can receive a signal with a predetermined signal strength. A plurality of user terminals 16M and 16F are used to illustrate mobile users and fixed users, respectively. Mobile users 16M may comprise but are not limited to automotive applications, personal digital assistant applications and cellular phone applications. Fixed user terminals 16F may, for example, comprise business-base or home-base communication systems. Each user terminal 16F and 16M may receive a signal with the predetermined signal strength or receive an antenna radiation spot in a spot beam pattern that is available from high altitude communication device 18.

Communication system 10 further includes a gateway station 20 that is coupled to terrestrial networks 22. Communication system may also include a device operations center 24. Both gateway station 20 and device operations center 24 are in communication with high altitude communication device 18. Gateway station 20 provides a link between user terminals 16F, 16M and terrestrial networks 22 through high altitude communications device 18. Device operation center 24 provides command and control functions to communications device 18. Although illustrated as two separate units, gateway station 20 and device operation center 24 may be combined into the same physical location.

The communication signals between high altitude communication device 18 and user terminals 16M and 16F may be referred to as user links 26. User links 26 represent the transmit and receive beams from both user device 16F, 16M and high altitude communications device 18. A feeder link 28 is defined between high altitude communications device 18 and gateway station 20.

High altitude communications device 18 may, for example, be a low earth orbit satellite ("LEO"), middle earth orbit satellite ("SO") or a geo-stationary satellite ("GEO"). Also, communications device 16 may also be comprised of a stratosphere-base platform such as those under development by AeroVironment. Helios is one such project being developed by AeroVironment. The Helios stratospheric platform is an unmanned vehicle that can fly for several months at an altitude of about 60,000 feet above the earth. Helios is a solar-powered, electric plane that is modular in design and may be configured in a variety of ways. The stratospheric platform is operated through the device operations center 24 to fly in a small radius flight path over a given spot on the earth.

High altitude communications device 18 is used as a communication node for gateway station 20 and user terminals 16F and 16M, each of which have an antennas that are pointed in the direction of the high altitude communications device 18. Although only one gateway station 20 is illustrated in the figure, those skilled in the art would recognize that various numbers of gateway stations may be employed. As would be further described below, gateway is station 20 with an antenna that has a beam width wide enough to maintain a communication link with high altitude communication device 18 throughout the flight path. In the case of medium earth orbit and low earth orbit satellites, the antennas of these devices may be electronically steered.

High altitude communication device 18 has a controller 30 that is used to control the communication with user terminal 16M, 16F and gateway station 20. In the present example, the controller 30 is used to generate a plurality of beams in a time division multiple access system.

Figure 2:
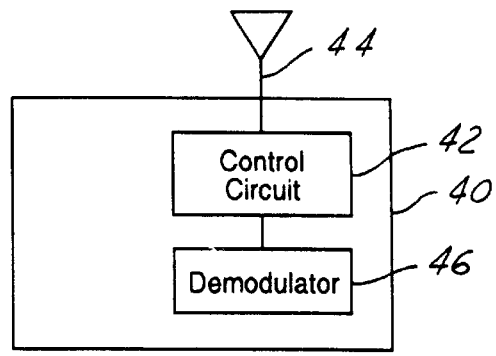
FIG. 2 is a high level block diagrammatic view of a receiving device having a receiver according to the present invention.

Referring now to FIG. 2, a generic receiving device 40 is illustrated. The generic receiving device 40 may include one of the devices above such as user terminals 16F, 16M and the high altitude communication device 18. The receiving device 40 has a control circuit 42 coupled to antenna 44. The control circuit 42 is preferably microprocessor-based and is capable of processing the received signal as is further described below. The control circuit 42 provides a processed signal to a demodulator 46. This is advantageous from the prior art which required demodulation prior to signal processing.

Figure 3:
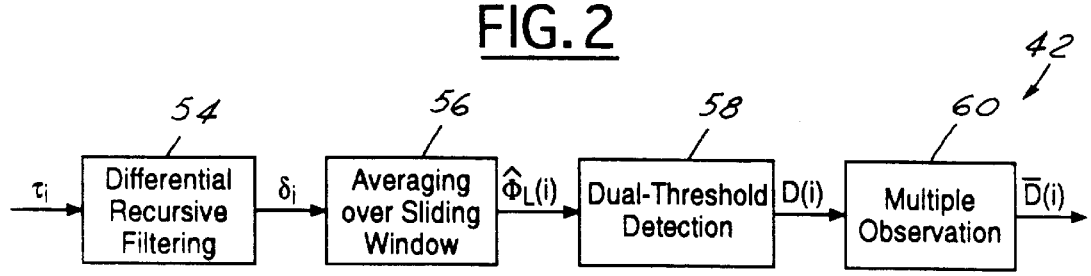
FIG. 3 is a flow chart of an outage detection process according to the present invention.

Referring now to FIG. 3, in the following description various types of transmissions or combinations of transmissions may be used. For example, FACCH3, DKAB or TCH3 may be used. Control circuit 42 is illustrated in more detail. Control circuit 42 has a differential recursive filtering block 54, an averaging sliding window block 56, a dual-threshold detection block 58, and a multiple observation block 60. Each block improves the results of the previous block. The description of each of the blocks will now be taken in turn.

The differential recursive filtering block 54 uses a recursive filter to obtain the differential amplitude over the estimated symbol timing. To perform outage detection is necessary to prevent no-target tracking once an outage occurs. To perform outage detection a detection metric is obtained from the symbol timing.

Figure 4:
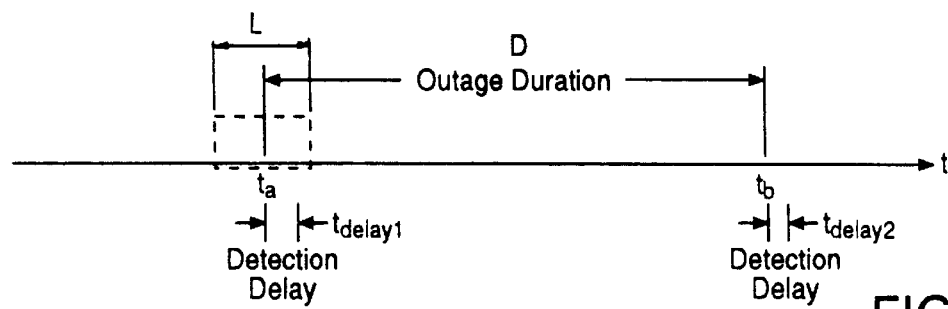
FIG. 4 is a graphical illustration of an outage and detection window according to the present invention.

Referring now to FIG. 4, the symbol timing is estimated as $$\hat{\tau}_p \approx \hat{\tau}_{p-1} + \gamma_t \delta_p \qquad \text{Equation (1)}$$

where $\gamma_t < 1$ is a forgetting factor which controls both bandwidth and gain of the recursive filter. $\delta_p$ is obtained with direct estimation of amplitude from the received burst, $$c_1'^{(p)} = \exp(j2\pi\hat{\tau}_{p-1}/T) \sum_{k=0}^{NM-1} Z_k \cdot \exp(-j2\pi k/M) \qquad \text{Equation (2)}$$

$$\delta_p = \frac{T}{2\pi} \arg(c_1'^{(p)}) \qquad \text{Equation (3)}$$

Figure 5:
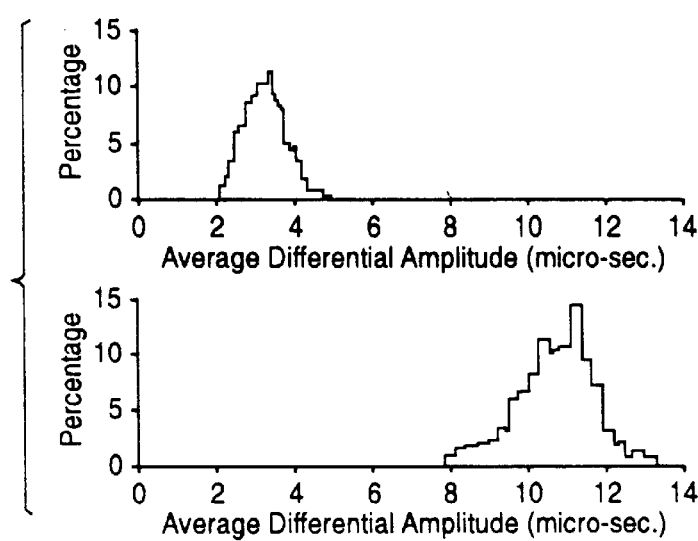
FIG. 5 is a statistical distribution of differential amplitude of symbol timing from normal transmission and channel outage

Referring now to FIG. 5, based on this differential amplitude, the detection metric is defined as $$\hat{\Phi}_L(i) = E\|\hat{\delta}_j\| \quad j = i, \cdots, i+L-1 \qquad \text{Equation (4)}$$

where L is the length of sliding window for averaging process E[ ] is illustrated in FIG. 4. Appropriately large number of samples L should be considered for stable $\hat{\Phi}_L(i)$ Simulation demonstrates that L=25 is an adequate choice. The outage duration D is determined between a first time $\tau_a$ and a second time $\tau_b$ (a first and second received signal).

As mentioned above, a transmission channel transmission can be FACCH3, DKAB or TCH3. DKAB is an interim burst carrying only 10 symbols during traffic inactivity. The timing estimation performance varies with the bursts transmitted under different operation conditions. FIG. 5 shows the statistical distribution of the detection metric of FACCH3. The distribution was formed under a fading channel condition with K=9 dB, $f_d$=10 Hz, and Es/N0=−0.5 dB. The outage detection with no false alarm is easily achievable by a single threshold classification.

Figure 6:
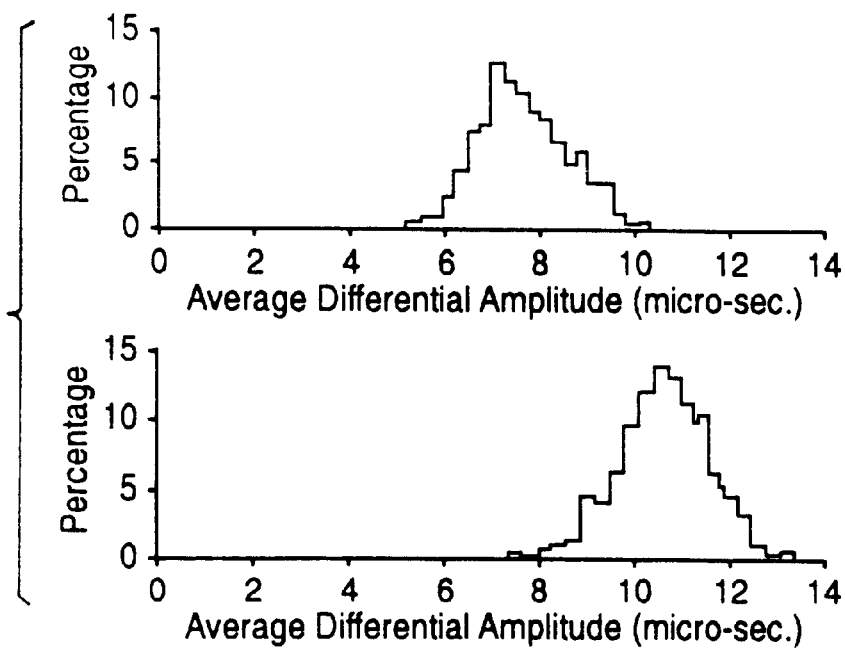
FIG. 6 is a statistical distribution of differential amplitude of symbol timing from normal transmission and channel outage when the symbol timing is estimated from short burst.

When transmission of FACCH is mixed with DKAB, especially with higher percentage of the latter, the detection is not straightforward. This is due to the fact that DKAB carries less data symbols, and thus the timing estimation is poor, especially when Es/N0 is as low as −0.5 dB. This is the lowest operation condition for DKAB. Although a minimum-duty cycle is maintained during signaling phase, that is, at least 16% FACCH vs. 84% DKAB are transmitted, larger variation of $\hat{\Phi}_L(i)$ can still be expected. FIG. 6 shows the histograms of $\hat{\Phi}_L(i)$ from minimum-duty cycle transmission. They are obtained under the Rician fading channel condition with K=9 dB, $f_d$=10 Hz. The upper portion illustrates the transmission at Es/N0=−0.5 dB while the lower portion the case of outage. It can be seen that these two distributions are largely overlapped over each other. One single boundary for error-free classification does not exist. To perform reliable detection, special procedures have to be applied to account for such detection difficulty. Though they usually come at the cost of detection delay, the impact is negligent as long as the timing is maintained close to the target through the outage.

To achieve reliable detection in the case as illustrated in FIG. 6, supplemental procedures may be used. These are described in further detail below.

When an outage occurs, the symbol timing $\hat{\tau}_p$ drifts by way of a "random walk", which is reflected by the detection metric $\hat{\Phi}_L(i)$ The metric, however, may not be a reliable indicator of the end of outage. This is due to the fact that the timing may not be maintained close to the true value during outage.

On the other hand, the true timing variation, if any, is relatively. For the following description the assumed outage is no more than 6 seconds. This may, for example, be a design constraint of the system At the average rate of $\dot{\tau}$=0.2 $\mu$s/second, the true timing shifts around 1.2 $\mu$s. With minor adjustment, the differential recursive timing estimation of Equation (3) may still be utilized for detection.

When an outage is detected at burst p', estimation using Equation (1) is performed as, $$\hat{\tau}_p = \hat{\tau}_{p_0-N} + \gamma \cdot \hat{\delta}_p \quad p > p_0 \qquad \text{Equation (6)}$$

where $\hat{\tau}_{p_0-N}$ is the estimated timing prior to outage. Based on $\delta_p$ from Equation (6), the metric by Equation (4) reflects the statistical variation when the outage is over.

As shown in FIG. 4, there is an overlap between the two distributions. Reliable detection may not be obtained with one single threshold. The solution is thus the status-dependent dual-threshold procedure, of block 48 of FIG. 3.

Let $\chi_1$ and $\chi_2$ denote two presumed threshold quantities of $\chi_1 > \chi_2$. A detection state D(i) is 1 for regular transmission and 0 for outage. Depending on the state D(i-1) of burst i-1, either $\chi_1$ or $\chi_2$ is used accordingly. During normal transmission, $\chi_1$ is used for detection, $$\text{When } D(i-1) = 1, \ D(i) = \begin{cases} 0, & \text{if } |\hat{\Phi}_L(i)| > \chi_1 \\ 1, & \text{if } |\hat{\Phi}_L(i)| \leq \chi_1 \end{cases} \qquad \text{Equation (7)}$$

and the $\chi_1$ is used during outage, $$\text{When } D(i-1) = 0, \ D(i) = \begin{cases} 0, & \text{if } |\hat{\Phi}_L(i)| > \chi_2 \\ 1, & \text{if } |\hat{\Phi}_L(i)| \leq \chi_2 \end{cases} \qquad \text{Equation (8)}$$

By using the above detection procedure with state-dependent dual-threshold, the reliability is largely enhanced, though it comes at inevitable detection delay.

Figure 7:
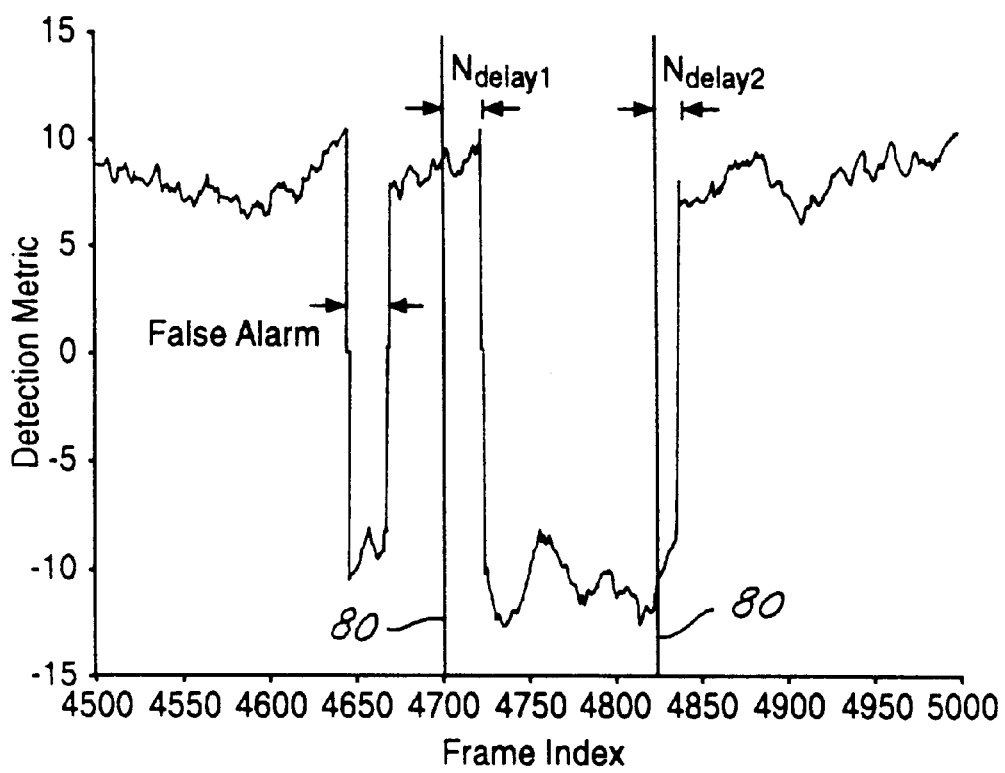
FIG. 7 is a plot of a detection metric profile according to the present invention when M=1.

Referring now to FIG. 7, a profile of detection metric $\Phi_L(i)$ with one occurrence of outage is shown. The polarity indicates the detection status. Positive $\Phi_L(i)$ represents regular transmission while negative the occurrence of outage. They are obtained under the Rician fading channel with Es/N0=−0.5 dB, and Es/N0=−200 dB respectively. The true outage occurs from burst frame 4701 to 4825, as indicated by the vertical solid lines 80. With threshold $\chi_1$=10 and $\chi_2$=8, the actual detection is indicated by the polarity transition. Detection delay can be seen by the laps of the polarity transition following the solid lines. In addition, one false alarm occurs around burst frame 4650.

In FIG. 4, $N_{delay1}$ and $N_{delay2}$ are the detection delays due to statistical averaging. Although no transmitted signal is received during outage, detection delay $N_{delay1}$ should be considered for recursive filtering of Equation (6) to prevent random drifting involved.

In addition to the dual-threshold procedure of combining Equation (7) and Equation (8), another procedure is described in this section as a supplemental approach for further improvement of detection. Instead of making the detection decision from one single $\hat{\Phi}_L(i)$, multiple observation using multiple observation block 50 over consecutive $\hat{\Phi}_L(i)$ has been found to provide better decision statistics.

Let N(i) denote a counter $$N(i) = \sum_{m=0}^{M-1} D(i-m) \qquad \text{Equation (9)}$$

where D(i) is the detection state as defined in Equation (7) and Equation (8).

Then detection decision is made as $$\overline{D}(i) = \begin{cases} 1, & \text{if } N(i) = M \\ 0, & \text{if } N(i) < M \end{cases} \qquad \text{Equation (10)}$$

where 1 and 0 of $\overline{D}(i)$ indicates regular transmission and outage respectively as for D(i).

To some extent, the multiple-observations are equivalent to extending the length of sliding window L in Equation (4). Considering the individual randomness, however, they are not exactly the same. Simulation demonstrates that multiple observation provides extra capability of reducing occurrence of false alarms.

In operation, the combination of the section above the differential amplitudes $\delta_i$ is first obtained by performing the differential recursive filtering over the estimated symbol timing. As described in above, estimation with constant reference is implemented during outage for better timing and detection performance. A mode switching is thus involved, $$\hat{\tau}_p = \begin{cases} \hat{\tau}_{p-1} + \gamma \cdot \hat{\delta}_p, & \overline{D}(i) = 1 \\ \hat{\tau}_{p_0-N} + \gamma \cdot \hat{\delta}_p, & \overline{D}(i) = 0 \end{cases} \qquad \text{Equation (11)}$$

where $\overline{D}(i)$ is the detection decision of Equation (10) with 1 and 0 indicating regular transmission and outage respectively. When the outage is over, the regular differential recursive filtering is resumed, and any discrepancy between the tracking loop and the true timing is limited which decreases quickly after the regular recursive filtering resumes.

By performing Equation (4) with L=25, the detection metric $\hat{\Phi}_L(i)$ is obtained. Based on this quantity, detection state D(i) are declared by Equation (7) or Equation (8), depending on the previous state. As described above, multiple-observations may be employed to prevent false alarms. More observations leads to longer detection delay. Simulation demonstrates that M=10 in Equation (10) provides a good compromise between delay and detection reliability. The detection decision is thus made as $\overline{D}(i)$.

Figure 8:
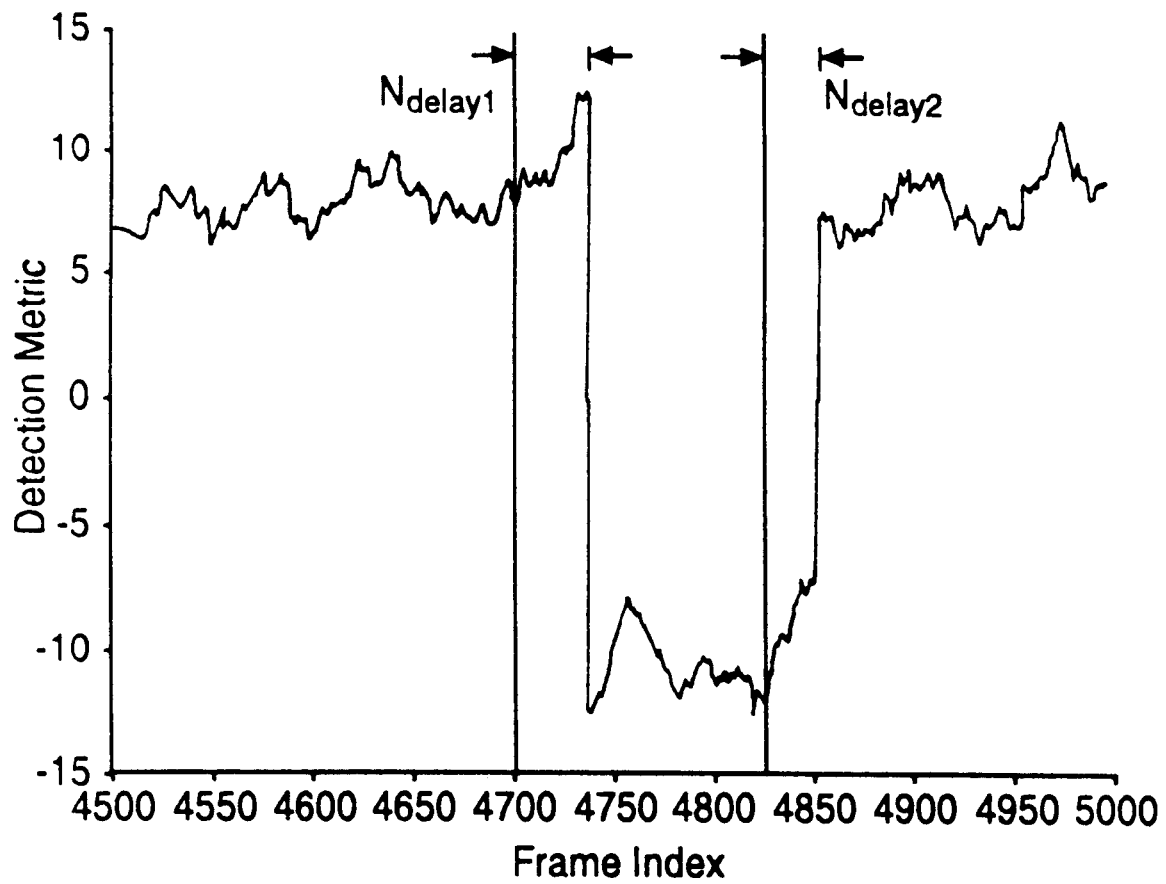
FIG. 8 is a plot of a detection metric profile according to the present invention when M=10.

FIG. 8 shows the same detection process as that of FIG. 7. Instead of M=1 in FIG. 7, however, M=10 is applied. It can be seen that the false alarm as shown in FIG. 8 is eliminated due the multiple-observation detection. Obviously it is achieved with extra detection delay.

Although the distribution of detection metric exhibits large overlap between the cases of regular transmission and outage, reliable detection can still be achieved at the cost of extra detection delay. With closed-loop estimation, the impact of detection delay is negligible for both timing and detection. Therefore it is believed that the proposed scheme is desirable procedure for maintaining timing and frequency synchronization through short link outage. In addition, the scenario may also be extended to the frequency estimator for anti-lock detection.

While particular embodiments of the invention have been shown and described, numerous variations alternate embodiments will occur to those skilled in the art. Accordingly, it is intended that the invention be limited only in terms of the appended claims.

What is claimed is:

1. A communication system comprising:
   a receiver circuit for receiving a first received signal and a second received signal thereafter, said receiver circuit having a recursive filter for generating an differential amplitude of a symbol timing estimate from said first received signal.

2. A communication system as recited in claim 1 wherein said recursive filter generates a sliding window having a predetermined length.

3. A communication system as recited in claim 1 wherein said receiver circuit establishes a first threshold and a second threshold between which outage is determined.

4. A communication system as recited in claim 1 wherein said receiver circuit generates the differential amplitude estimate from a first observation and a second observation.

5. A method of operating a communication system comprises the steps of:
   receiving a received signal;
   estimating a symbol timing;
   generating an differential amplitude estimate during the symbol timing; and,
   indicating an outage in response to the amplitude estimate.

6. A method as recited in claim 5, further comprising the steps of performing multiple observation to obtain an amplitude estimate.

7. A method as recited in claim 5 further comprising the step of generating a first threshold and a second threshold for performing the step of generating an amplitude estimate.

8. A method as recited in claim 7 wherein said first threshold corresponds to an outage.

9. A method as recited in claim 7 wherein said second threshold corresponds to a regular transmission.

10. A communication system comprising:
    a high altitude communication device generating a plurality of user link beams and a feeder link beam;
    a gateway terminal receiving the user link beam;
    a user terminal receiving at least one of said user link beams, said user terminal comprising a receiver circuit for receiving a received signal, said receiver circuit for receiving a first received signal and a second received signal thereafter; said receiver circuit having a recursive filter for generating an amplitude estimate from said first received signal.

11. A system as recited in claim 10 wherein said high altitude communication device comprises a stratospheric platform.

12. A communication system as recited in claim 10 wherein said high altitude communication device comprises a satellite.

13. A communication system as recited in claim 10 wherein said gateway terminal is coupled to a terrestrial network.

* * * * *